United States Patent
Moore et al.

(10) Patent No.: US 12,435,025 B2
(45) Date of Patent: Oct. 7, 2025

(54) TRIPHENYLPHOSPHONIUM-TETHERED SALICYLAMINE DERIVATIVES

(71) Applicant: MTI BIOTECH, INC., Ames, IA (US)

(72) Inventors: Kevin Moore, Ames, IA (US); Michael P. Murphy, Newmarket (GB); Naji Abumrad, Nashville, TN (US); John Fuller, Jr., Zearing, IA (US)

(73) Assignee: MTI Biotech, Inc., Ames, IA (US)

( * ) Notice: Subject to any disclaimer, the term of this patent is extended or adjusted under 35 U.S.C. 154(b) by 814 days.

(21) Appl. No.: 17/425,933

(22) PCT Filed: Jan. 27, 2020

(86) PCT No.: PCT/US2020/015221
§ 371 (c)(1),
(2) Date: Jul. 26, 2021

(87) PCT Pub. No.: WO2020/154731
PCT Pub. Date: Jul. 30, 2020

(65) Prior Publication Data
US 2022/0112152 A1 Apr. 14, 2022

Related U.S. Application Data

(60) Provisional application No. 62/796,999, filed on Jan. 25, 2019.

(51) Int. Cl.
*C07C 215/50* (2006.01)
*C07F 9/54* (2006.01)

(52) U.S. Cl.
CPC .......... *C07C 215/50* (2013.01); *C07F 9/5442* (2013.01)

(58) Field of Classification Search
CPC ....... C07C 215/50; A61P 39/06; C07F 9/5442
See application file for complete search history.

(56) References Cited

U.S. PATENT DOCUMENTS

| | | |
|---|---|---|
| 2008/0161267 A1 | 7/2008 | Taylor et al. |
| 2016/0289252 A1 | 10/2016 | Murphy et al. |
| 2021/0053907 A1 | 2/2021 | Long |

FOREIGN PATENT DOCUMENTS

| | | |
|---|---|---|
| CN | 1839142 A | 9/2006 |
| CN | 101300014 A | 11/2008 |
| CN | 109836341 A | 6/2019 |
| JP | 2009-528992 A | 8/2009 |
| WO | WO2007/046729 A1 | 4/2007 |
| WO | WO2007/098352 A2 | 8/2007 |
| WO | WO 2018/048932 A1 | 3/2018 |
| WO | WO 2018/201074 A1 | 11/2018 |

OTHER PUBLICATIONS

Pitchford (Regulatory Toxicology and Pharmacology, 98 (2018) 190-198) (Year: 2018).*
Zagol-Ikapitte (Chem. Res. Toxicol. 2010, 23, 240-250) (Year: 2010).*
Zagol-Ikapitte, et al., Characterization of Scavengers of γ-ketoaldehydes that do not inhibit prostaglandin biosynthesis, Chemical Research in Toxicology,2010,23(1), p. 240-250).
Ouadi, et al., Task-Specific Ionic Liquids Bearing 2-Hydroxybenzylamine Unites: Synthesis and Americium-Extractions Studies; Chemistry—A European Journal ,2006, 12(11), p. 3074-3081.
Ryzhkina, et al., Russian Chemical Bulletin,2002,51(12), p. 2183-2188).
Kudryavtseva, et al., Molecular Crystals and Liquid Crystals Science and Technology, Section C: Molecular Materials , 1994,3(4), p. 271-277.
Database Pubchem Compound [online],Nov. 21, 2008.
Database Pubchem Compound [online],Aug. 9, 2005.
Anonymous : "2-(Aminomethyl) 6-methoxyphenol hydrochloride", Pubchem, Nov. 21, 2008 (Nov. 21, 2008), pp. 1-11.
Anonymous: "Phenol, 2-((pentylamino)methyl)", Pubchem,Aug. 9, 2005 (Aug. 9, 2005), pp. 1-11.
Lisa M. Pichford et al., "First-in-human study assessing safety, tolerability and pharmacokinetics of 2-hydroxybenzylamine acetate, a selective dicarbonyl electrophile scavenger, in healthy volunteers"; BMC Pharmacology and Toxicology, vol. 20, Issue 1; Jan. 5, 2019; pp. 1-5.

* cited by examiner

*Primary Examiner* — Umamaheswari Ramachandran
(74) *Attorney, Agent, or Firm* — Stites & Harbison PLLC; Richard S. Myers, Jr.

(57) ABSTRACT

Novel salicylamine derivatives are targeted directly to the mitochondria to increase effectiveness and lower required dosages in the treatment of conditions caused by inflammation or oxidative stress.

9 Claims, 3 Drawing Sheets

TPP Tethered to the Amine Group of Salicylamine

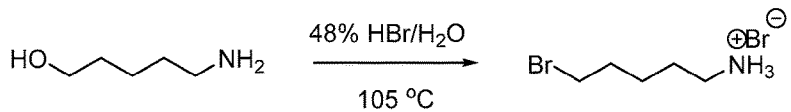

1.11g 5-amino-1-pentanol (10 mmol) is added to a 25 mL round bottom flask. 10 mL of 48% HBr in H₂O is added. The reaction vessel is refluxed for three hours. The solvent is removed under reduced pressure yield a brown, sticky solid. The compound is used in the next step without any further purification.

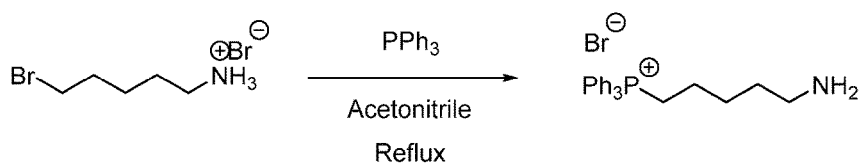

2.47g 5-bromopentan-1-amine hydrobromide (10 mmol) is placed in a 100 mL round bottom flask. 50 mL acetonitrile is added to the flask. 5.27g triphenylphospine (20 mmol) is added to the flask. The flask is heated under reflux for 60 hrs. Solvent is removed under reduced pressure yielding brown crude oil. The oil is dissolved into 30 mL water and washed 3x30 mL diethyl ether. Aqueous phase is basified with sodium carbonate, then extracted 3x30 mL dichloromethane. Solvent was removed under reduced pressure.

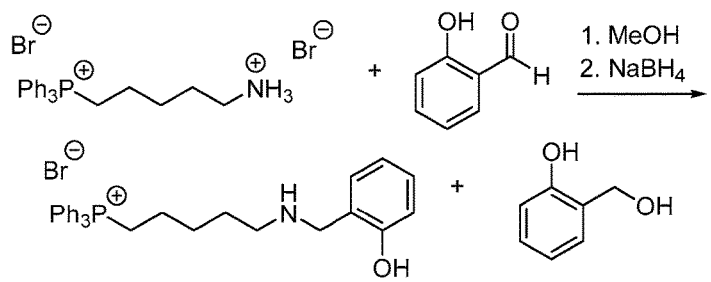

0.30g (5-aminopentyl)triphenylphosphonium bromide (0.7 mmol) placed in 10 mL round bottom flask. 5 mL methanol added. 0.07 mL salicaldehyde (0.7 mmol) added. Flask stirred overnight. 0.04g sodium borohydride (1.05 mmol, 1.5 eq) added to flask. Reaction allowed to proceed until gas formation stopped. Solution poured into 20 mL water, and extracted 3x 20 mL dichloromethane. Solvent removed under reduced pressure. Crude solid dissolved in minimal amount of dichloromethane, and flooded with diethyl ether. White crystals collected forming mixture of products in a 4:5 ratio.

FIG 3.

TRIPHENYLPHOSPHONIUM-TETHERED SALICYLAMINE DERIVATIVES

CROSS-REFERENCE TO RELATED APPLICATIONS

This application claims priority from International Patent Application No. PCT/US2020/015221, filed Jan. 27, 2020, which claims benefit to U.S. Provisional Application Ser. No. 62/796,999 filed Jan. 25, 2019, the entire disclosures of which are incorporated herein by this reference.

FIELD

This disclosure relates generally to salicylamine derivatives capable of targeting mitochondria.

BACKGROUND

Oxidative stress plays a fundamental role in the pathogenesis of many neurodegenerative and cardiovascular diseases. Inflammatory processes are implicated in many of the same diseases. It is well recognized that leukocytes are recruited into sites of inflammation. While it is well established that activation of these inflammatory cells upregulates the expression of COX-2 resulting in enhanced prostaglandin formation, this also is accompanied by the generation of reactive oxygen species (ROS) by these cells via NADPH oxidases, etc. Accordingly, it has been recognized that oxidative stress is also an important component of inflammation; the reverse is also true oxidative stress has also been causally linked the development of inflammation. Therefore, controlling the cellular reactive oxygen species is an important component in the treatment of conditions arising from inflammation and oxidative stress.

SUMMARY

Some aspects of the present disclosure include a class of lipophilic analogs of pyridoxamine (PM) such as salicylamine (SA, also known as 2-hydroxybenzylamine or 2-HOBA) as well as derivatives of salicylamine.

In some aspects of the present disclosure SA and/or derivatives of SA, are directed to the mitochondria.

Some aspects include SA derivatives conjugated to TPP salts are disclosed herein. To further investigate the possibilities offered by targeting the mitochondria directly, different TPP conjugates of SA are synthesized, as further disclosed below.

Some aspects include therapeutic dosages of the SA-TPP conjugate, ranging from at least about 5 µg to about 1000 mg every 24 hours. In some aspects of the present disclosure, the dose of the SA-TPP conjugate administered to a subject in a given 24 hour period or its equivalent time frame is selected from the following ranges; from at least about 5 µg to about 10 µg, from at least about 10 µg to about 20 µg, from at least about 20 µg to about 40 µg, from at least about 40 µg to about 60 µg, from at least about 60 µg to about 80 µg, from at least about 80 µg to about 100 µg, from at least about 100 µg to about 120 µg, from at least about 120 µg to about 140 µg, from at least about 140 µg to about 160 µg, from at least about 160 µg to about 180 µg, from at least about 180 µg to about 200 µg. In some aspects, the dose in a given 24 hour period is on the order of about from at least about 200 µg to about 300 µg, or from at least about 300 µg to about 400 µg, or from at least about 400 µg to about 500 µg, or from at least about 500 µg to about 600 µg, or from at least about 600 µg to about 700 µg or, from at least about 700 µg to about 800 µg, or, from at least about 800 µg to about 900 µg, or, from at least about 600 µg to about 700 µg, or from at least about 800 µg to about 900 µg, or, from at least about 900 µg to about 1000 µg. In other aspects, the dose is more than 1 mg every 24 hours, in some aspects the dose per 24-hour period is from at least about 1 mg to about 10 mg, or from about 10 mg to about 25 mg, or from about 25 mg to about 50 mg, or from about 50 mg to about 75 mg, or from about 75 mg to about 100 mg.

Some aspects include therapeutic dosages of the SA-TPP conjugate, ranging from 200 µg to 100 mg every 24 hours. In some aspects of the present disclosure, the dose of the SA-TPP conjugate is 5.0 mg every 24 hours. In some aspects, the dose is 10.0 mg every 24 hours. In other aspects, the dose is 20.0 mg every 24 hours. In still other aspects, the dose is 33.0 mg every 24 hours. In other aspects, the dose is 55.0 mg every 24 hours. In yet other aspects, the dose is 82.5 mg every 24 hours.

The first embodiment of the present disclosure comprises a compound of Formula I:

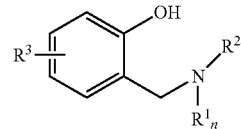

Formula I wherein $R^1$ is hydrogen with an optional counterion; $R^2$ is selected from hydrogen or alkyl, optionally further substituted with $R^4$; $R^3$, which may be substituted at any ring position (e.g., ortho, meta or para to the functional groups), is either a hydrogen, hydroxy, acyl, or alkoxy, optionally substituted with $R^4$; $R^4$ is a cation with an optional counterion; and n is either 1 or 2. The functional group on $R^3$ may or may not have an intervening alkyl group chain. Optionally, the substitution pattern for Formula 1 is as follows: $R^1$ is hydrogen with an optional counterion; $R^2$ is selected from hydrogen or alkyl, optionally substituted with $R^4$; $R^3$ is selected from hydrogen, halogen, hydroxy, acyl, alkoxy, $C_1$-$C_6$ alkyl optionally substituted with alkyl, alkenyl, hydroxy, acyl, or alkoxy, or carbonyl optionally substituted with hydrogen, hydroxy, acyl, alkoxy, $C_1$-$C_6$ alkyl, $C_1$-$C_6$ alkenyl, O, N, or S, optionally substituted with hydrogen, hydroxy, or $C_1$-$C_6$ alkyl; $R^4$ is a cation with optional counterion; and n is either 1 or 2.

A second embodiment includes the compound of Formula I, wherein $R^3$ is hydrogen and $R^2$ is alkyl, optionally substituted with $R^4$.

A third embodiment includes the compound of any one of the first and the second embodiment, wherein $R^4$ is a triphenylphosphonium cation.

A fourth embodiment includes the compound of any one of the first to the third embodiments, wherein the counterion is bromide.

A fifth embodiment includes the compound of any one of the first to the fourth embodiments, wherein $R^2$ is hydrogen and n is 2.

A sixth embodiment includes the compound of any one of the first to the fifth embodiments, wherein the counterion to $R^1$ is selected from chloride, mesylate, bicarbonate, fluoride, nitrate, bromide, sulfate, citrate, benzoate, saccharin anion, and acetate.

A seventh embodiment includes the compound of any one of the first to the sixth embodiments, wherein $R^3$ is alkoxy.

An eighth embodiment includes the compound of any one of the first to the seventh embodiments, wherein $R^4$ is a triphenylphosphonium cation or quinone-derived ammonium cation, such as, for example, [10-(4,5-dimethyl-3,6-dioxocyclohexan-1,4-dien-1-yl)decyl](tributyl)ammonium bromide.

A ninth embodiment includes the compound of any one of the first to the eighth embodiments, wherein the counterion to $R^4$ is tetrafluoroborate.

A tenth embodiment includes the compound of any one of the first to the ninth embodiments, wherein the compound includes:

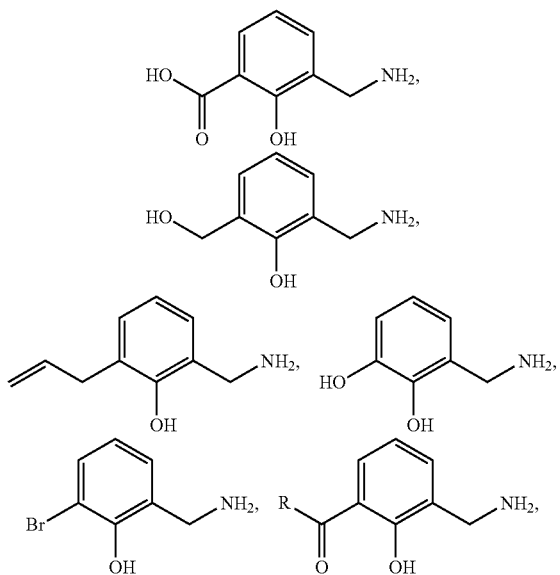

wherein R is hydrogen, hydroxy, $C_1$-$C_6$ alkyl, O, N, or S, optionally substituted with hydrogen, hydroxy, or $C_1$-$C_6$ alkyl, and/or wherein the compound includes

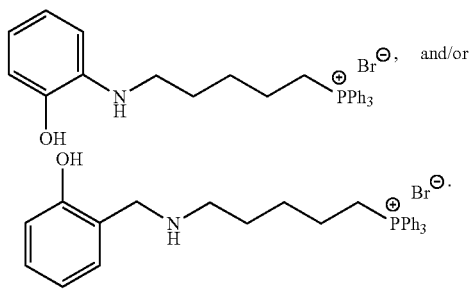

An eleventh embodiment includes a method of synthesizing compounds of any one of the first to the tenth embodiments.

A twelfth embodiment includes a composition comprising the compound of any one of the first to the tenth embodiments and a pharmaceutically acceptable carrier.

A thirteenth embodiment includes the administration of a composition of the twelfth embodiment to a human or an animal to alleviate conditions caused by inflammation and/or oxidative stress.

BRIEF DESCRIPTION OF THE FIGURES

FIG. 3. Schema for synthesizing TPP tethered to the amine group of Salicylamine.

DESCRIPTION

Figure 1:
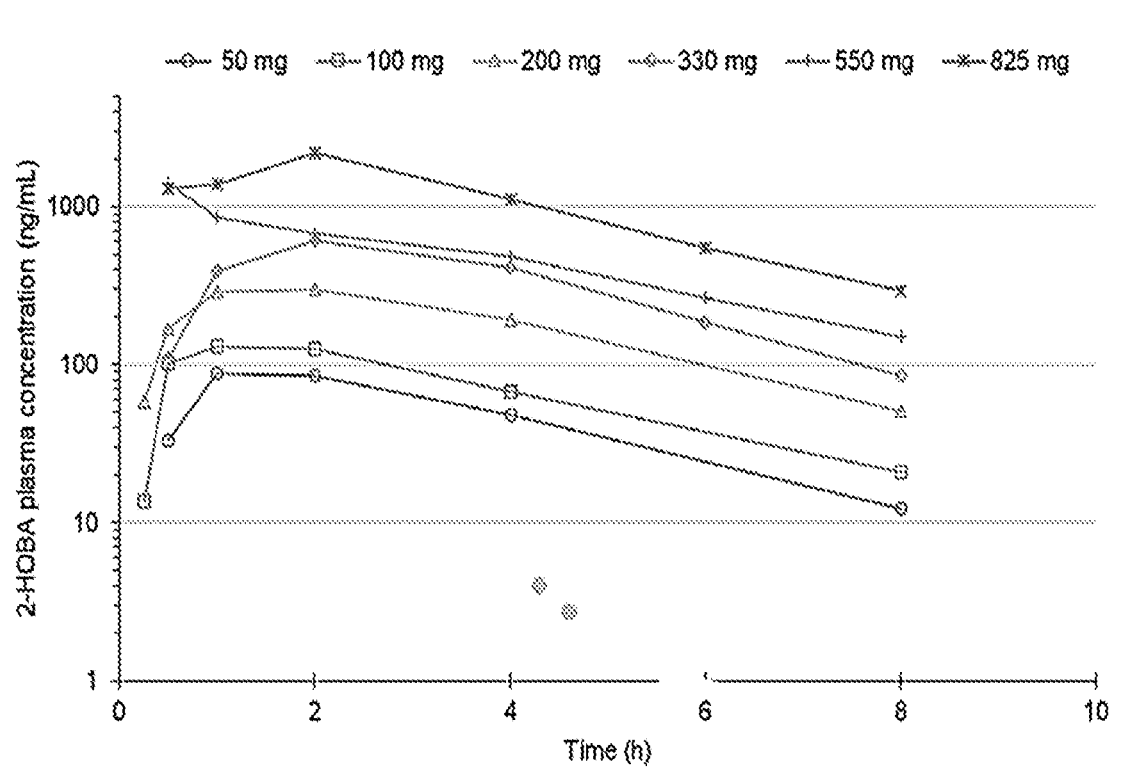
FIG. 1. A graph showing the change in mean plasma concentrations (ng/mL of 2-HOBA over time.

For the purposes of promoting an understanding of the principles of the novel technology, reference will now be made to the preferred embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates are within the scope of this disclosure and the claims.

As used herein, unless explicitly stated otherwise or clearly implied otherwise the term 'about' refers to a range of values plus or minus 10 percent, e.g. about 1.0 encompasses values from 0.9 to 1.1.

As used herein, unless explicitly stated otherwise or clearly implied otherwise the terms 'therapeutically effective dose,' 'therapeutically effective amounts,' and the like, refers to a portion of a compound that has a net positive effect on the health and wellbeing of a human or other animal. Therapeutic effects may include an improvement in longevity, quality of life and the like these effects also may also include a reduced susceptibility to developing disease or deteriorating health or wellbeing. The effects may be immediate realized after a single dose and/or treatment or they may be cumulative realized after a series of doses and/or treatments.

Pharmaceutically acceptable salts include salts of compounds of the present disclosure that are safe and effective for use in mammals and that possess a desired therapeutic activity. Pharmaceutically acceptable salts include salts of acidic or basic groups present in compounds of the present disclosure. Pharmaceutically acceptable acid addition salts include, but are not limited to, hydrochloride, hydrobromide, hydroiodide, nitrate, sulfate, bisulfate, phosphate, acid phosphate, isonicotinate, acetate, lactate, salicylate, citrate, tartrate, pantothenate, bitartrate, ascorbate, succinate, maleate, gentisinate, fumarate, gluconate, glucaronate, saccharate, formate, benzoate, glutamate, methanesulfonate, ethanesulfonate, benzensulfonate, p-toluenesulfonate and pamoate (i.e., 1,1'-methylene-bis-(2-hydroxy-3-naphthoate)) salts. Certain compounds of the present disclosure may form pharmaceutically acceptable salts with various amino acids. Suitable base salts include, but are not limited to, aluminum, calcium, lithium, magnesium, potassium, sodium, zinc, and diethanolamine salts. For addition information on some pharmaceutically acceptable salts that can be used to practice the present disclosure please reviews such as Berge, et al., 66 J. PHARM. SCI. 1-19 (1977), Haynes, et al, J. Pharma. Sci., Vol. 94, No. 10, October 2005, pgs. 2111-2120 and the like.

Both inflammation and oxidant stress give rise to, among other species, bicyclic endoperoxides (prostaglandin $H_2$ and $H_2$-isoprostanes, respectively) that may non-enzymatically rearrange to form highly reactive γ-ketoaldehydes (γKA). These γKAs, termed levuglandins and isoketals, react to covalently modify cellular proteins through, for example, addition to lysine residues, as well as covalently modifying phosphatidylethanolamine by binding the free amine. Levels of γKA protein adducts appear to increase in a number of conditions associated with inflammation and oxidative stress including Alzheimer's Disease, atherosclerosis, myocardial infarction, end stage renal disease, sepsis, atrial fibrillation, chronic kidney disease, radiation-induced tissue injury, and hyperoxia. The development of selective inhibitors that block endogenous formation of γKA protein adducts in vivo would offer significant benefits as a treatment option for a variety of conditions associated with oxidative stress and inflammation.

The lipophilic analogs of pyridoxamine (PM) such as salicylamine (SA) as well as derivatives of SA are well suited for this task. By way of explanation and not limitation, these molecules may inhibit protein modification by acting as γKA scavengers and preferentially react with γKAs over other lipid carbonyls produced by peroxidation such as 4-hydroxynonenal. In vitro, the reaction rate of PM and its analogs with γKAs is more than a thousand times faster than the reaction rate of lysyl residues. However, as lipid peroxidation forms γKAs esterified in situ to phospholipids, lipophilic analogs are more efficacious than the highly hydrophilic PM. In keeping with this notion, the lipophilic PM analog SA is a significantly better inhibitor of γKA protein adducts in cells than PM. Additionally, SA protects HepG2 cells from cytotoxicity induced by hydrogen peroxide, while PM is ineffective. Similarly, SA protects against γKA and oxidant-induced sodium channel function inhibited by γKA or oxidants. The protective effects of SA as an inhibitor of γKAs induced protein modification in cultured cells provide clear evidence of its in vivo biological importance. These results further suggest that using SA and SA derivatives to inhibit γKAs is a useful therapeutic strategy for the treatment of disease.

In eukaryotic cells, the mitochondria are the site of oxidative phosphorylation, in this capacity they are at risk from both suffering from oxidative damage as well as generating oxidative damage. Targeting delivery of SA and SA derivatives, which exhibit antioxidant properties to the mitochondria allow the molecules to be administered at a lower dosage, thus avoiding potential adverse effects of using higher doses to achieve therapeutic outcomes, while still producing a desirable therapeutic result.

SA has a very short half-life in the blood, estimated to be about 120 minutes. In part because of its short half-life in the blood stream to maintain therapeutic levels of SA in the blood stream it may be necessary to administer SA in at least three divided doses. Moreover, in blood salicylamine appears to be processed into salicylic acid. In blood, salicylic acid has a longer half-life than salicylamine. Accordingly, repeated doses of SA over time may result in an accumulation of very high levels of salicylic acid. Furthermore, high levels of salicylic acid may modify the metabolism of SA, thereby diminishing the therapeutic effectiveness of SA.

By way of explanation and not limitation, if salicylamine acts on the mitochondria, directing a higher percentage of SA administered to a patient to the mitochondria may produce a better therapeutic outcome. Targeting the mitochondria directly by way of the TPP-SA conjugates disclosed herein reduces the length of time that SA is exposed to the blood, creates a higher effective concentration of SA at the mitochondria, and makes it possible to deliver a lower dose of the SA active agent.

There is also the possibility that the accumulation of salicylic acid in the blood could result in very high levels that are either toxic or otherwise have adverse effects. The half-life of salicylic acid in the blood is anywhere between 2 and 12 hours depending on the dose used or the amount produced. Nearly 80-90% of all salicylate in the blood is bound to protein, and the rest is in the free form, and the free form is the one detectable by normal assays. Most of the elimination of circulating salicylate is via urine. A blood level of equal to or exceeding 35 mg/dL is considered toxic, hence any further accumulation of salicylic acid in the body could become high enough to cause death. Toxicity often appears within a few days of use. The most severe cases, leading to coma and death, occurred in patients with psoriasis, who have had salicylic acid topically applied to the skin in very high doses. Accumulation of salicylic acid does not occur if the composition is targeted directly to the mitochondria, allowing for much lower dosages.

Briefly, the safe doses of SA currently taught in the art produce increased plasma levels of SA. When SA is present in the blood stream at elevated levels a portion of the blood borne SA may find its way into the cell; ultimately, a portion of the SA administered to the patient may find its way into the mitochondria.

Some strategies for preferentially or selectively delivering molecules to the mitochondria exploit the substantial negative electrochemical potential maintained across the inner mitochondrial membrane. Delocalized lipophilic cations are particularly effective at crossing the hydrophobic membranes and, hence, preferentially accumulate within the mitochondrial matrix. Some molecules, which take advantage of this approach, include a triphenylphosphonium (TPP) salt headpiece tethered to a molecule to be delivered into the mitochondria. TPP has the ability to be transported into the mitochondria against a concentration gradient. In other words, tethering a compound to TPP will result in concentrations that are much higher in the mitochondria than in the cytoplasm or the blood. In some aspects of the present disclosure described herein, the dosage of TPP-bound SA required will be much lower than SA alone, and thus mitigating any potential toxic or other unwanted side effects.

In some aspects of the present disclosure disclosed herein, salicylamine derivatives are targeted directly to the mitochondria. This class of molecules prevents the formation of γKA protein adducts by acting as a surrogate amine for adduction rather than relying upon antioxidant effects to supress the formation of formation of γKAs. This novel set of compounds provides both a valuable tool for further probing biological pathways, as well as a potentially powerful treatment for conditions caused by inflammation and oxidative stress.

In some embodiments, TPP is tethered to a salicylamine derivative to target salicylamine delivery to the mitochondria of cells. The TPP moiety may be tethered to different positions on the salicylamine ring and may be attached through different atoms. In one embodiment of the present disclosure, (5-((2-hydroxylbenzyl)amino)pentyl)triphenylphosphonium bromide is synthesized as shown below in Scheme 1.

Scheme 1
Synthesis of (5-((2-hydroxylbenzyl)amino)pentyl)triphenylphosphonium bromide

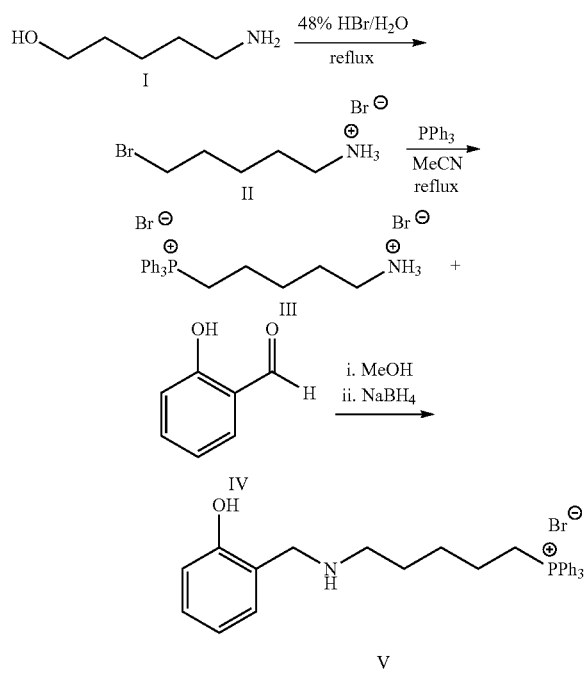

Referring now to FIG. 3. Starting from 5-amino-1-pentanol, the desired triphenylphosphonium salt is synthesized in three steps. The alcohol is treated with concentrated hydrobromic acid, to provide the desired halogen in quantitative yield. The primary halide is reacted with triphenylphosphine ($PPh_3$) in acetonitrile (MeCN), yielding the triphenylphosphonium salt in quantitative yield. Following reductive amination with the triphenylphosphonium salt and salicylaldehyde in methanol (MeOH), the desired triphenylphosphonium salt is formed.

In further embodiments of the invention, the cation can be tethered in both different positions on the ring and through different atoms. For example, a dicationic species, in which the triphenylphosphonium cation is tethered to an oxygen atom para to the hydroxyl group, is synthesized as shown below in Scheme 2.

Scheme 2
Synthesis of (5-(allyloxy)-2-hydroxyphenyl)methanaminium acetate

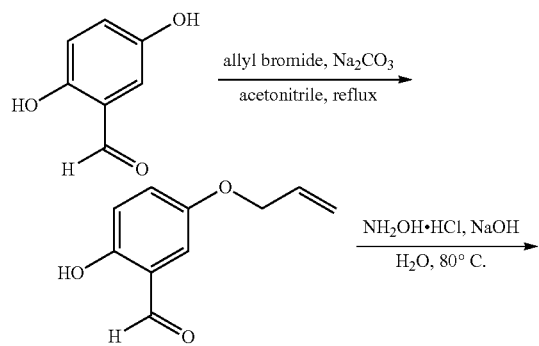

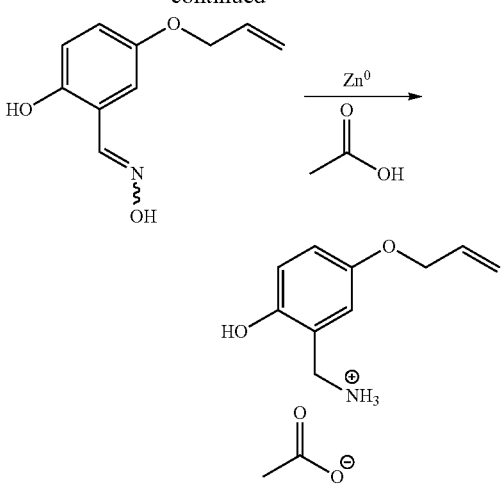

The 5-position hydroxyl group is selectively allylated using allyl bromide and sodium carbonate. Treatment with hydroxylamine hydrochloride and sodium hydroxide in water gives the corresponding oxime, which is then reduced to the amine with zinc in acetic acid.

Scheme 3
Synthesis of (3-(3-(ammoniomethyl)-4-hydroxyphenoxy)propyl)triphenylphosphonium tetrafluoroborate

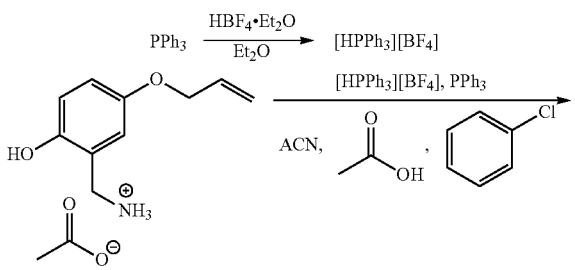

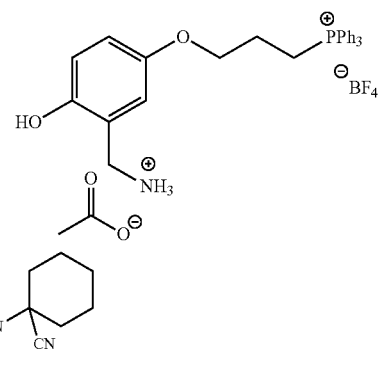

The salt is treated with triphenylphosphonium tetrafluoroborate in the presence of triphenylphosphine, 1,1'-azobis(cyclohexanecarbonitrile) (ACN), and acetic acid to give the desired dicationic species.

Scheme 4
Synthesis of deuterated salts

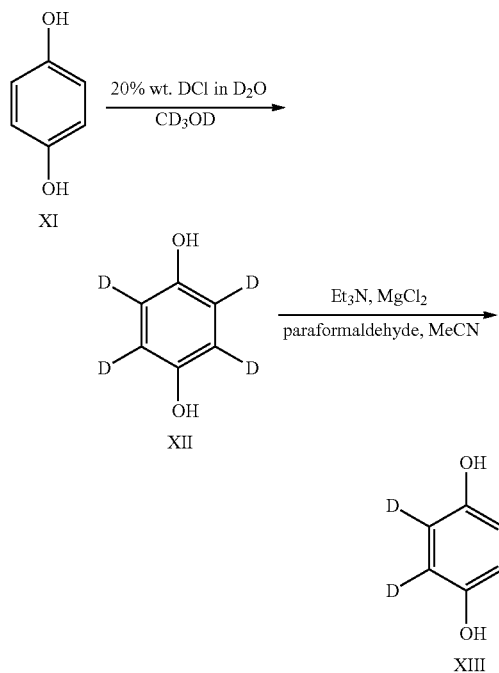

Starting from hydroquinone, tetradeuteration can be accomplished using deuterochloric acid in deuterium oxide and deuterated methanol. From there, formylation can be performed using triethylamine (Et$_3$N), magnesium chloride, and paraformaldehyde in acetonitrile. With deuterated 2,5-dihydroxybenzaldehyde XIII, the desired deuterated salt may be synthesized using the synthesis methods described above.

In animal models in which mice are administered salicylamine in drinking water, dosages between 1 and 10 grams per liter of water generate tissue concentrations of 10-500 micromolar, which falls within the range known to inhibit γKAs in cells, although dosages as high as 1 gram per milliliter of water have been used.

Other modes of administration of salicylamine are shown to be effective. Mice dosed intraperitoneally 200 mg/kg of salicylamine show decreased edema in paws injected with carrageenan. Derivatives of salicylamine, such as 5-methyl salicylamine, are also effective in managing inflammation.

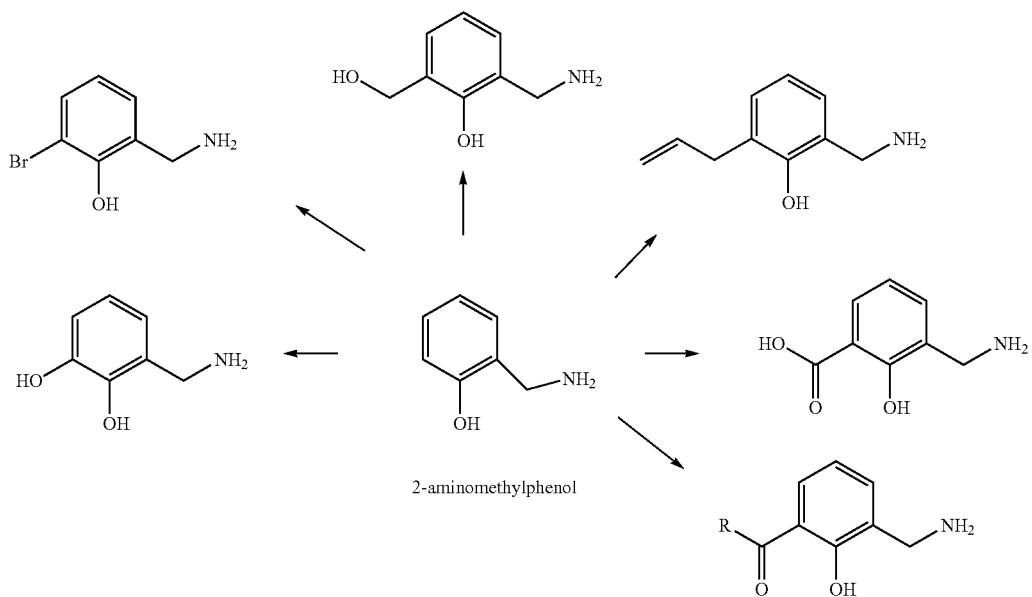

Scheme 5 Synthesis of C-6 derivatives of 2-aminomethylphenol

R is hydrogen, hydroxy, $C_1$-$C_6$ alkyl, O, N, or S, optionally substituted with hydrogen, hydroxy, or $C_1$-$C_6$ alkyl.

These derivates of 2-aminomethylphenol can be prepared by the orthoacylation making use of the aldol chemistry of the phenol alkoxides. Alternatively, the allyl ether of the phenol can be made and use a Claisen rearrangement to insert an allyl group at the 6-position. These new compounds include functionality to allow for the preparation of conjugates while preserving the aminophenol moiety. Still another approach is ortho-carboxylation via the alkoxide and carbon dioxide is another approach. These compounds include functionalities to allow for the preparation of conjugates while preserving the aminophenol moiety. The compounds depicted in scheme 5 can be conjugated with triarylphosphines (phosphonium salts) which promote reagent to localize in the mitochondria. For example, the 6-hydroxymethyl analog can be connected with a hydroxyalkyl phosphonium salt using an acid catalyst.

The term "alkyl" group includes straight or branched saturated aliphatic hydrocarbon chains, such as, for example, methyl, ethyl, isopropyl, tert-butyl, and the like. The term "alkoxy" group includes straight, branched, or cyclic hydrocarbons bound to an oxygen atom, such as, for example, methoxy, ethoxy, isopropoxy, tert-butoxy, and the like.

The compounds of the present disclosure can be administered as the sole active pharmaceutical agent, or can be used in combination with one or more other agents useful for treating or preventing various complications, such as, for example, Alzheimer's disease and other neurodegenerative diseases, hypertension, fatty liver disease, alcohol-related liver disease, chronic obstructive pulmonary disease, pulmonary hypertension, radiation-induced tissue injury, and gastroesophageal reflux disease. The compounds of the present disclosure, as the sole active pharmaceutical agent or in combination with one or more other agents, may also be used in the prevention of ischaemia reperfusion injury and to prevent cardiac dysrhythmia, for example. When administered as a combination, the therapeutic agents can be formulated as separate compositions that are given at the same time or different times, or therapeutic agents can be given as a single composition.

The compounds of the present disclosure may be made up in a solid form (including granules, powders, or suppositories) or in a liquid form (e.g., solutions, suspensions, or emulsions). They may be applied in a variety of solutions and may be subjected to conventional pharmaceutical operations such as sterilization and/or may contain conventional adjuvants, such as preservatives, stabilizers, wetting agents, emulsifiers, buffers, etc.

For administration, the compounds of the present disclosure are ordinarily combined with one or more adjuvants. For example, they may be admixed with lactose, sucrose, starch powder, cellulose esters of alkanoic acids, stearic acid, talc, magnesium stearate, magnesium oxide, sodium and calcium salts of phosphoric and sulfuric acids, acacia, gelatin, sodium alginate, polyvinylpyrrolidine, and/or polyvinyl alcohol, and tableted or encapsulated for conventional administration.

Alternatively, they may be dissolved in saline, water, polyethylene glycol, propylene glycol, carboxymethyl cellulose colloidal solutions, ethanol, corn oil, peanut oil, cottonseed oil, sesame oil, tragacanth gum, and/or various buffers. Other adjuvants and modes of administration are well known in the pharmaceutical art. The carrier or diluent may include time delay material, such as glyceryl monostearate or glyceryl distearate alone or with a wax, or other materials well known in the art.

In therapeutic applications, the compounds of the present disclosure may be administered to a mammalian patient in an amount sufficient to reduce or inhibit the desired indication. Amounts effective for this use depend on factors including, but not limited to, the route of administration, the stage and severity of the indication, the general state of health of the mammal, and the judgment of the prescribing physician. The compounds of the present disclosure are safe and effective over a wide dosage range. However, it will be understood that the amounts of pyridoxamine actually administered will be determined by a physician, in the light of the above relevant circumstances.

The compounds described herein may be administered by any suitable route, including orally, enterally, parentally, by inhalation or rectally in dosage unit formulations containing conventional pharmaceutically acceptable carriers, adjuvants, and vehicles, including liposomes. The term parenteral as used herein includes, subcutaneous, intravenous, intra-arterial, intramuscular, intra-sternal, intra-tendinous, intra-spinal, intra-cranial, intra-thoracic, infusion techniques, intra-cavity, enteral, or intra-peritoneal.

EXAMPLES

Example 1: Synthesis (5-((2-hydroxybenzyl)amino)pentyl)triphenylphosphonium Bromide (V)

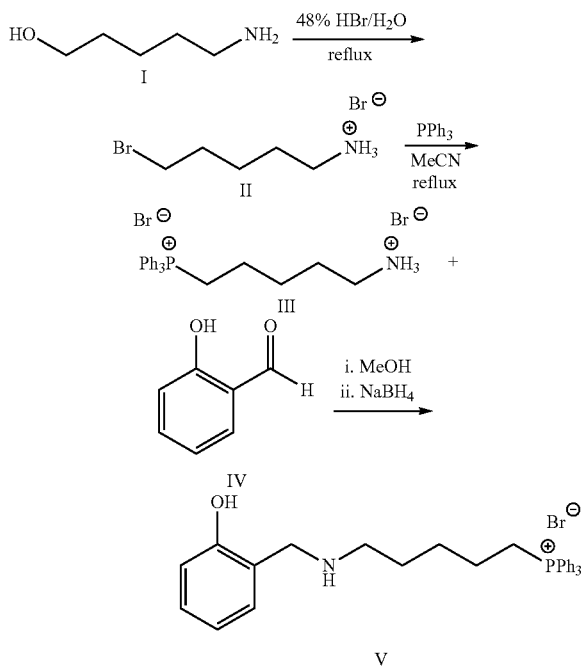

5-amino-1-pentanol I is reacted with concentrated hydrobromic acid, yielding the desired halogen II in quantitative yield. Bromide II is then reacted with triphenylphosphine in acetonitrile, yielding the triphenylphosphonium salt III in quantitative yield. Reductive amination with triphenylphosphonium salt III and salicylaldehyde IV is performed in methanol in the presence of sodium borohydride to give triphenylphosphonium salt V in 45% yield based on recovered starting material.

Referring now to FIG. 3. Further details regarding the synthesis of TPP tethered to the amine group of salicylamine.

Example 2: Synthesis of (5-(allyloxy)-2-hydroxyphenol)methanaminium Acetate (IX)

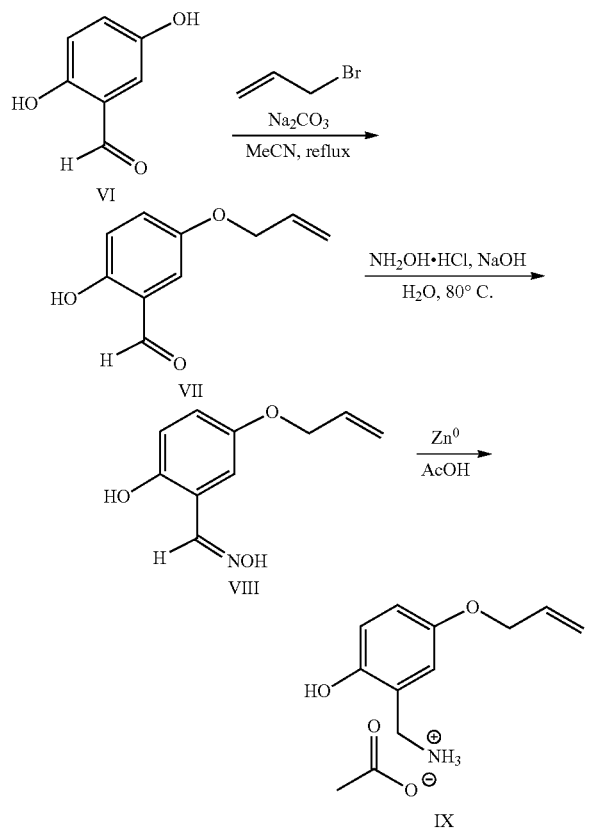

To a 25 mL round bottom flask was added 2,5-dihydroxybenzaldehyde VI (1.48 g, 10.7 mmol), acetonitrile (MeCN) (11 mL), sodium carbonate (2.27 g, 21.4 mmol), and allyl bromide (0.93 mL, 10.7 mmol). The reaction was heated to 80° C. and allowed to reflux overnight. The resulting solution was cooled to room temperature, poured into 20 mL 1M NaOH, and extracted with 20 mL of ethyl acetate (EtOAc) to remove 2,5-bis(allyloxy)benzaldehyde side product. The aqueous layer was acidified with concentrated HCl to pH 1 and extracted with 3×20 mL of EtOAc. The organic layer was dried with $MgSO_4$ and filtered. Solvent was removed under reduced pressure. Product was purified via column chromatography 1:4 ethyl acetate:hexanes, giving 5-(allyloxy)-2-hydroxybenzaldehyde VII (0.35 g, 1.99 mmol) in 19% yield.

To a 25 mL round bottom flask was added 5-(allyloxy)-2-hydroxybenzaldehyde VII (0.16 g, 0.9 mmol). Hydroxylamine hydrochloride (0.10 g, 1.37 mmol) and sodium hydroxide (0.06 g, 1.37 mmol) were dissolved in 1.5 mL deionized water. This aqueous solution was added, and the reaction was heated to 80° C. for 1 hour. The mixture was allowed to cool to room temperature and was poured into 20 mL of an HCl solution (pH 1). The solution was extracted with 3×20 mL of EtOAc, dried with $MgSO_4$, and filtered. Solvent was removed under reduced pressure, giving 5-(allyloxy)-2-hydroxybenzaldehyde oxime VIII (0.17 g, 0.9 mmol) in quantitative yield.

To a 10 mL round bottom flask was added 5-(allyloxy)-2-hydroxybenzaldehyde oxime VIII (0.17 g, 0.9 mmol), then acetic acid (AcOH) (2 mL) and zinc dust (0.20 g, 3 mmol). The reaction was allowed to stir overnight at room temperature. The solution was diluted with methanol (5 mL), and zinc dust was filtered off, and solvent was removed under reduced pressure. Several washes with toluene followed by removal of solvent under reduced pressure were required to remove trace amounts of acetic acid. (5-(allyloxy)-2-hydroxyphenol)methanaminium acetate IX (0.21 g, 0.9 mmol) was recovered in quantitative yield.

Example 3: Synthesis of Triphenylphosphonium Tetrafluoroborate

To a 125 mL Erlenmeyer flask was added triphenylphosphine ($PPh_3$) (2.91 g, 11 mmol) and dissolved in diethyl ether ($Et_2O$) (15 mL). Tetrafluoroboric acid diethyl ether complex (1.36 mL, 10 mmol) was added, and a white precipitate formed. The precipitate was collected via filtration and recrystallized from chloroform giving triphenylphosphonium tetrafluoroborate (0.97 g, 2.7 mmol) in 27% yield.

Example 4: Synthesis of (3-(3-(ammoniomethyl)-4-hydroxyphenoxy)propyl)triphenylphosphonium Acetate Tetrafluoroborate (X)

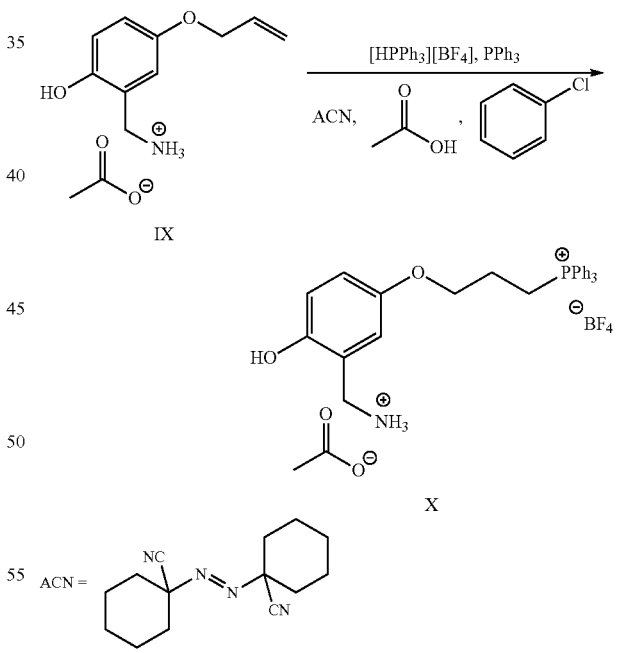

To a 50 mL round bottom flask was added (5-(allyloxy)-2-hydroxyphenol)methanaminium acetate IX (0.14 g, 0.6 mmol), chlorobenzene (PhCl) (25 mL), and acetic acid (2 mL) After the compound completely dissolved, 1,1'-azobis(cyclohexanecarbonitrile) (0.03 g, 0.12 mmol), triphenylphosphonium tetrafluoroborate (0.51 g, 2.64 mmol), and triphenylphosphine (0.03 g, 0.12 mmol) were added. Reaction vessel sealed with a septum and sparged with argon gas for 5 minutes. Reaction was heated to 110° C. under balloon pressure and allowed to react overnight. Mixture was cooled to room temperature and solvent was removed under reduced pressure. Several washes with toluene followed by removal of solvent under reduced pressure were required to remove trace amounts of acetic acid and chlorobenzene. Resulting crude solid was triturated several times with chloroform, giving (3-(3-(ammoniomethyl)-4-hydroxyphenoxy)propyl)triphenylphosphonium acetate tetrafluoroborate X (0.14 g, 0.29 mmol) in 48% yield.

Example 5: Synthesis of Triphenylphosphonium (TPP) Tethered to the Amine Group of Salicylamide

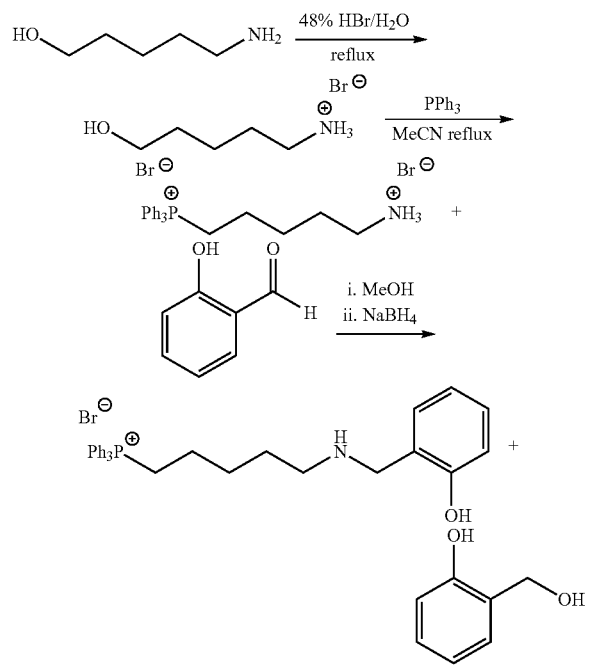

1.11 g 5-amino-1-pentanol (10 mmol) is added to a 25 mL round bottom flask. 10 mL of 48% HBr in $H_2O$ is added. The reaction vessel is refluxed for three hours. The solvent is removed under reduced pressure yield a brown, sticky solid. The compound is used in the next step without any further purification. 2.47 g 5-bromopentan-1-amine hydrobromide (10 mmol) is placed in a 100 mL round bottom flask. 50 mL acetonitrile is added to the flask. 5.27 g triphenylphospine (20 mmol) is added to the flask. The flask is heated under reflux for 60 hrs. Solvent is removed under reduced pressure yielding brown crude oil. The oil is dissolved into 30 mL water and washed 3×30 mL diethyl ether. Aqueous phase is basified with sodium carbonate, then extracted 3×30 mL dichloromethane. Solvent was removed under reduced pressure. 0.30 g (5-aminopentyl)triphenylphosphonium bromide (0.7 mmol) place in 10 mL round bottom flask. 5 mL methanol added. 0.07 mL salicaldehyde (0.7 mmol) added. Flask stirred overnight. 0.04 g sodium borohydride (1.05 mmol, 1.5 eq) added to flask. Reaction allowed to proceed until gas formation stopped. Solution poured into 20 mL water, and extracted 3×20 mL dichloromethane. Solvent removed under reduced pressure. Crude solid dissolved in minimal amount of dichloromethane, and flooded with diethyl ether. White crystals collected forming mixture of products in a 4:5 ratio.

Example 6: Dosing Guidance Study

Subjects

Healthy male and non-pregnant female volunteers over 18 years of age were eligible to participate. Subjects were not permitted to take any medications 2 weeks prior to or during the study. Exclusion criteria included known cardiac, kidney, or hepatic disease; presence of diseases that could manifest morbidity or symptoms/signs that could confound interpretation of the study results; the need to discontinue any drug administered as standard of care treatment; and the unwillingness or inability to use approved birth-control methods.

Compound

2-Hydroxybenzylamine (as the acetate salt, CAS 1206675-01-5) was obtained from TSI (China) Co., Ltd. (Shanghai, China). A commercial production lot was used (Lot 16120312). Our laboratory verified the purity of the commercial lot to be >99% via HPLC and NMR spectroscopy. Hard gel capsules (Capsugel, Jiangsu, China) containing 50, 110, and 412.5 mg of 2-hydroxybenzylamine acetate (corresponding to 34, 75, and 281 mg 2-hydroxybenzylamine) were prepared by TSI (China) Co., Ltd. Determinations of average fill weight, uniformity of weight, disintegration, 2-hydroxybenzylamine content, acetate content, and microbial and analytical tests were within all specification limits.

Study Design

This study was an open-label, single ascending dose study designed to assess pharmacokinetics, safety, and tolerability of single doses of 2-hydroxybenzylamine acetate. A 3+3 clinical trial design with a modified Fibonacci sequence dosing scheme[14] was used with a starting dose of 50 mg; thereafter, dosages were increased to 100, 200, 330, 550, and 825 mg. These doses of 2-hydroxybenzylamine acetate correspond to 34, 68, 136, 224, 373, and 560 mg 2-hydroxybenzylamine. Each dose escalation was initiated only after reviewing safety data from all subjects receiving the previous dose.

Subjects were admitted to the Vanderbilt University Clinical Research Center and remained on the unit for 24 hours after administering 2-hydroxybenzylamine acetate orally in capsules to participants. Though this study did not include a placebo control, staff nurses and participants were blinded to the capsule dosage content. Subjects were monitored at protocol-defined intervals for 24 hours after administration of 2-hydroxybenzylamine. Safety assessments included vital signs (heart rate, respiration rate, blood pressure, and $SpO_2$), clinical laboratory parameters (blood biochemistry, hematology, and urinalysis), 12-lead ECGs, and potential adverse event assessments. All adverse events were recorded, regardless of whether they were considered study-related.

Pharmacokinetic Sampling and Analysis

Blood samples for pharmacokinetic analyses were collected at baseline, 0.25, 0.5, 1, 2, 6, 4, 8, and 24 hours after 2-hydroxybenzylamine acetate administration for all dose levels. The 0.25-hour sample was only collected for dosages≤200 mg, and the 6-h sample was only collected for dosages≥330 mg. Plasma concentrations of 2-hydroxybenzylamine as well as the primary metabolite of 2-hydroxybenzylamine, salicylic acid, were determined for each time point.

$[^2H_4]$-2-hydroxybenzylamine, prepared by Dr. Venkataraman Amarnath as previously described[11], was used as an internal standard. An internal standard solution (100 ng/mL) of ($[^2H_4]$-2-hydroxybenzylamine was prepared in acetonitrile and added to all standards, quality control samples, and patient samples. Standard and quality control samples of 1 mg/mL 2-hydroxybenzylamine were prepared in water. Eight standard curve samples (5, 10, 20, 100, 200, 1000, 2000, and 5000 ng/mL) were prepared with blank human plasma (Bioreclamation, Westbury, NY). In addition, three quality control samples (15, 300, and 3000 ng/mL) were prepared in blank human plasma. Plasma samples were allowed to thaw at room temperature and then vortexed. Internal standard solution (400 µL) and 100 µL of either plasma, quality controls, or standards were added and mixed in a protein precipitation filter 96-well plate (Phenomenex, Torrance, CA). The solution was eluted into a 96-well plate using a positive pressure manifold and then dried under nitrogen gas at 40° C. The samples were then reconstituted in 97/3 v/v water/acetonitrile with 10 mM ammonium formate for analysis. Liquid chromatography tandem mass spectrometry analysis of 2-hydroxybenzylamine was performed with Shimadzu Nexera X2 LC-30AD pumps, column oven, and degasser (Kyoto, Japan) (column: C18 2.1×50 mm, 1.7 µm, Phenomenex, Torrance, CA) coupled with a Sciex QTrap 5500 mass spectrometer with TurboV ion source (Framingham, MA). Quantification of 2-hydroxybenzylamine was performed using electrospray ionization in positive ionization mode. The column temperature was set to 60° C. and the flow rate was 0.5 mL/min. A gradient of 3-90% B from 0 to 0.90 min was established by using a mobile phase A of 10 mM ammonium formate in water and mobile phase B of 1% formic acid in acetonitrile. Quantification of 2-hydroxybenzylamine was validated over the range of 5-5000 ng/mL, with within-run precision of 3.7-7.0%, bias −9.7-2.8 and between run precision of 4.4-6.2%, bias −7.1-1.64. All standards and quality control samples met acceptance criteria (standard curve $R^2>0.90$, 66.7% of all QC samples and at least 50% at each concentration within 15% of nominal concentration).

Plasma concentration-time data was imported into Phoenix WinNonlin® 8.0 software (Certara USA, Inc., Princeton, NJ) to estimate the oral pharmacokinetic parameters of 2-hydroxybenzylamine from individual subjects at each dose level. Non-compartmental analysis using Model 200 (Plasma; Single Extravascular Dose; Linear Log Trapezoidal Method) was performed on each plasma concentration-time profile to estimate individual pharmacokinetic parameters—half-life, area under the concentration-time curve (AUC), maximum observed plasma concentration (Cmax), and the time to reach the maximum observed plasma concentration (Tmax).

Statistical Analyses

Descriptive statistics (means, standard deviations, standard error) were used for demographics, safety, and pharmacokinetic assessments.

Study Population

TABLE 1

Demographic Characteristics

| | 2-Hydroxybenzylamine acetate dose | | | | | | |
|---|---|---|---|---|---|---|---|
| | 50 mg | 100 mg | 200 mg | 330 mg | 550 mg | 825 mg | Total |
| Volunteers (n) | 3 | 3 | 3 | 3 | 3 | 3 | 18 |
| Sex: female [n (%)] | 2 (66.7) | 1 (33.3) | 0 (0) | 3 (100) | 1 (33.3) | 2 (66.7) | 9 (50.0) |
| Age (y) | 25.7 ± 2.1 | 32.7 ± 6.4 | 27.7 ± 5.7 | 26.3 ± 4.0 | 28.0 ± 6.0 | 23.0 ± 2.6 | 27.2 ± 5.0 |
| Height (cm) | 174.3 ± 7.6 | 184.6 ± 11.7 | 174.2 ± 4.0 | 165.7 ± 6.8 | 175.7 ± 17.8 | 160.4 ± 5.6 | 172.5 ± 11.6 |
| Weight (kg) | 60.7 ± 2.1 | 95.0 ± 37.0 | 83.3 ± 30.6 | 60.0 ± 8.0 | 87.7 ± 33.8 | 68.3 ± 14.2 | 75.8 ± 25.1 |
| BMI (kg/m$^2$) | 20.1 ± 2.3 | 27.3 ± 7.8 | 27.2 ± 8.8 | 21.8 ± 1.3 | 27.5 ± 5.0 | 26.4 ± 3.8 | 25.0 ± 5.6 |
| Race | | | | | | | |
| Hawaiian/Pacific Islander | 0 (0) | 0 (0) | 0 (0) | 0 (0) | 1 (33.3) | 0 (0) | 1 (5.5) |
| White | 3 (100) | 3 (100) | 3 (100) | 3 (100) | 2 (66.7) | 3 (100) | 17 (94.4) |
| Ethnicity | | | | | | | |
| Hispanic/Latino | 0 (0) | 0 (0) | 0 (0) | 0 (0) | 1 (33.3) | 0 (0) | 1 (5.5) |
| Not Hispanic/Latino | 3 (100) | 3 (100) | 3 (100) | 3 (100) | 2 (66.7) | 3 (100) | 17 (94.4) |

Data are presented as means ± SD unless otherwise noted

Referring now to Table 1. A total of 18 volunteers were enrolled in and successfully completed the study (3 subjects at each dose level). Subject demographics are provided in Table 1 and were similar across dose groups.

Safety

TABLE 2

Summary of reported adverse events by dose

| | 2-Hydroxybenzylamine acetate dose | | | | | | |
|---|---|---|---|---|---|---|---|
| | 50 mg (n = 3) | 100 mg (n = 3) | 200 mg (n = 3) | 330 mg (n = 3) | 550 mg (n = 3) | 825 mg (n = 3) | Total (n = 18) |
| Any event, n (%) | 3 (100) | 0 | 1 (33) | 1 (33) | 0 | 0 | 5 (28) |
| Frequent urination | 2 (67) | 0 | 0 | 0 | 0 | 0 | 2 (11) |
| Headache | 0 | 0 | 1 (33) | 0 | 0 | 0 | 1 (5.5) |
| Itchy throat | 1 (33) | 0 | 0 | 0 | 0 | 0 | 1 (5.5) |

TABLE 2-continued

Summary of reported adverse events by dose

| | 2-Hydroxybenzylamine acetate dose | | | | | | |
|---|---|---|---|---|---|---|---|
| | 50 mg (n = 3) | 100 mg (n = 3) | 200 mg (n = 3) | 330 mg (n = 3) | 550 mg (n = 3) | 825 mg (n = 3) | Total (n = 18) |
| Rash | 1 (33) | 0 | 0 | 0 | 0 | 0 | 1 (5.5) |
| Sleepiness | 1 (33) | 0 | 0 | 0 | 0 | 0 | 1 (5.5) |
| Abdominal bloating | 0 | 0 | 0 | 1 (33) | 0 | 0 | 1 (5.5) |

Referring now to Table 2. All reported adverse events are summarized in Table 2 Five participants (28%) reported at least 1 adverse event during the study. The most common reported adverse event (2 incidences) was frequent urination (2 subjects, 11%). All adverse events were mild in intensity. No adverse events were determined to be study-related, and there was no dose-dependent increase in adverse event frequency or severity. No clinically significant changes in ECG recordings, vital signs, or laboratory parameters that were considered to be related to 2-hydroxybenzylamine were observed. There were no serious adverse events or deaths.

Pharmacokinetics

TABLE 3

Mean 2-hydroxybenzylamine pharmacokinetic parameters after a single oral dose

| | 2-Hydroxybenzylamine acetate dose | |
|---|---|---|
| Parameter | 50 mg (n = 3) | 100 mg (n = 3) |
| Half-life (h) | 2.04 | 2.33 |
| $C_{max}$ (ng/mL) | 90 | 156 |
| $t_{max}$ (h) | 1.33 | 1.33 |
| AUC (h · ng/mL) | 396 | 622 |
| $AUC_{extrap}$ (%) | 9.1 | 11.2 |

$C_{max}$, maximum observed plasma concentration; $t_{max}$, time to reach $C_{max}$; AUC, area under the concentration-time curve from zero to infinity; $AUC_{extrap}$, percentage of the AUC extrapolated from the last observed time point.
Clearance and volume of distribution are not reported due to the unknown value of F (bioavailability).

Referring now to Table 3 and FIG. 1. Mean 2-hydroxybenzylamine plasma concentration-time profiles and pharmacokinetic parameter estimates are shown in FIG. 1 and Table 3, respectively. Following oral administration of single doses of 2-hydroxybenzylamine, dose-dependent changes were observed for maximal plasma concentration ($C_{max}$) and area under the concentration-time curve (AUC). The mean time to reach $C_{max}$ was 1.6 hours and the mean half-life of 2-hydroxybenzylamine was 2.1 hours.

TABLE 4

Mean exposure of salicylic acid after a single oral dose of 2-hydroxybenzylamine acetate

| | 2-Hydroxybenzylamine acetate dose | | | | | |
|---|---|---|---|---|---|---|
| Parameter | 50 mg (n = 3) | 100 mg (n = 3) | 200 mg (n = 3) | 330 mg (n = 3) | 550 mg (n = 3) | 825 mg (n = 3) |
| $C_{max}$ (ng/mL) | 1072 | 1765 | 3948 | 8444 | 8611 | 17308 |
| $T_{max}$ (h) | 2.67 | 3.33 | 3.33 | 4.00 | 4.67 | 4.67 |
| $AUC_{0-inf}$ (h · ng/mL) | 8238 | 14578 | 34212 | 74402 | 77374 | 161588 |
| $AUC_{extrap}$ (%) | 9.2 | 10.9 | 1.7 | 2.0 | 1.7 | 1.4 |

Figure 2:
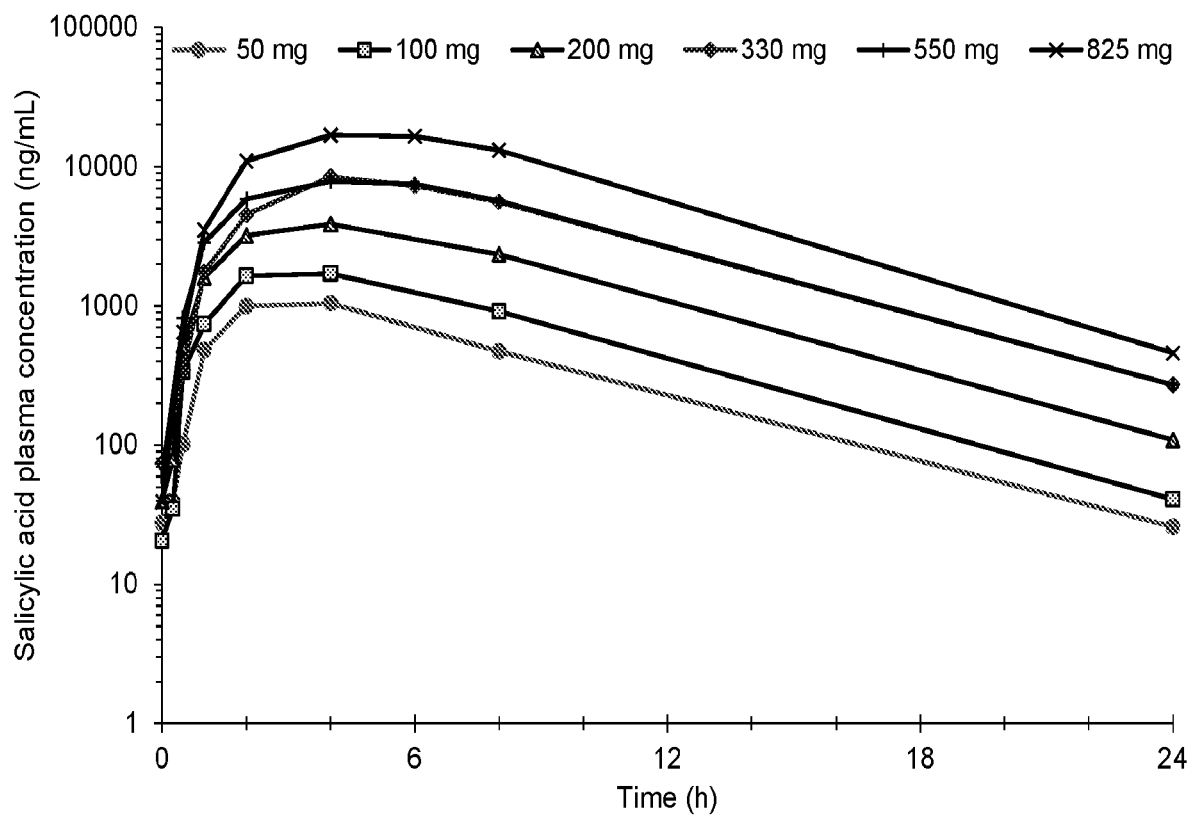
FIG. 2. A graph showing the change in mean plasma concentrations of salicylic acid after oral administration of 6 ascending single oral doses of 2-hydroxybenzyl amine acetate in healthy subjects (n=3 per dose level). See also Table 4.

$C_{max}$, maximum observed plasma concentration;
$T_{max}$, time to reach $C_{max}$;
$AUC_{0-inf}$, area under the concentration-time curve from zero to infinity;
$AUC_{extrap}$, percentage of the $AUC_{0-inf}$ extrapolated from the last observed time point Referring now to Table 4 and FIG. 2. Plasma concentrations of the primary metabolite of 2-hydroxybenzylamine, salicylic acid was also measured. Systemic exposure to salicylic acid following oral administration of single doses of 2-hydroxybenzylamine acetate at each dose level is shown in FIG. 2 and quantified in Table 4. Following oral administration of 2-hydroxybenzylamine, dose-dependent changes were observed in the systemic exposure ($C_{max}$ and AUC) of salicylic acid. The $t_{max}$ for salicylic acid ranged from 2.67 to 4.67 hours and tended to increase as the 2-hydroxybenzylamine dose increased.

REFERENCES

1. Amarnath, V.; Amarnath, K.; Amarnath, K.; Davies, S.; Roberts, L. J., 2nd. Pyridoxamine: an extremely potent scavenger of 1,4-dicarbonyls. *Chem. Res. Toxicol.* 2004, 17, 410-415.
2. Brame, C. J.; Salomon, R. G.; Morrow, J. D.; Roberts, L. J., 2nd. Identification of extremely reactive gamma-ketoaldehydes (isolevuglandins) as products of the isoprostane pathway and characterization of their lysyl protein adducts. *J. Biol. Chem.* 1999, $2^74$, 13139-13146.
3. Brame, C. J.; Boutaud, O.; Davies, S. S.; Yang, T.; Oates, J. A.; Roden, D.; Roberts, L. J., 2nd. Modification of proteins by isoketal-containing oxidized phospholipids. *J. Biol. Chem.* 2004, 279, 13447-13451.
4. Davies, S. S.; Talati, M.; Wang, X.; Mernaugh, R. L; Amarnath, V.; Fessel, J.; Meyrick, B. O.; Sheller, J.; Roberts, L. J., 2nd. Localization of isoketal adducts in vivo using a single-chain antibody. *Free Radic. Biol. Med.* 2004, 36, 1163-1174.
5. Davies, S. S.; Brantley, E. J.; Voziyan, P. A.; Amarnath, V.; Zagol-Ikapitte, I.; Boutaud, O.; Hudson, B. G.; Oates, J.

A.; Ii, L. J. Pyridoxamine Analogues Scavenge Lipid-Derived gamma-Ketoaldehydes and Protect against H(2)O(2)-Mediated Cytotoxicity. *Biochemistry* 2006, 45, 15756-15767.

6. Frantz, M.-C. and Wipf, P. Mitochondria as a target in treatment. *Environ. Mol. Mutagen* 2010, 51, 462-475.

7. Fukuda, K.; Davies, S. S.; Nakajima, T.; Ong, B. H.; Kupershmidt, S.; Fessel, J.; Amarnath, V.; Anderson, M. E.; Boyden, P. A.; Viswanathan, P. C.; Roberts, L. J., 2nd; Balser, J. R. Oxidative mediated lipid peroxidation recapitulates proarrhythmic effects on cardiac sodium channels. *Circ. Res.* 2005, 97, 1262-1269.

8. Hoppe, G.; Subbanagounder, G.; O'Neil, J.; Salomon, R. G.; Hoff, H. F. Macrophage recognition of LDL modified by levuglandin E2, an oxidation product of arachidonic acid. *Biochim. Biophys. Acta* 1997, 1344, 1-5.

9. Madan, R.; Levitt, J. A review of toxicity from topical salicylic acid preparations. *J. Amer. Acad. Dermatol.* 2014, 70, 788-92.

10. Nakajima, T.; Davies, S. S.; Matafonova, E.; Potet, F.; Amarnath, V.; Tallman, K. A.; Serwa, R. A.; Porter, N. A.; Balser, J. R.; Kupershmidt, S.; Roberts, L. J., II. Selective gamma-ketoaldehyde scavengers protect NaV1.5 from oxidant-induced inactivation. *J. Mol. Cell. Cardiol.* 2010, 48, 352-359.

11. Poliakov, E.; Brennan, M. L.; Macpherson, J.; Zhang, R.; Sha, W.; Narine, L.; Salomon, R. G.; Hazen, S. L. Isolevuglandins, a novel class of isoprostenoid derivatives, function as integrated sensors of oxidant stress and are generated by myeloperoxidase in vivo. *Faseb J* 2003, 17, 2209-2220.

12. Salomon, R. G.; Miller, D. B.; Zagorski, M. G.; Coughlin, D. J. Solvent Induced Fragmentation of Prostaglandin Endoperoxides. New Aldehyde Products from PGH2 and Novel Intramolecular 1,2-Hydride Shift During Endoperoxide Fragmentation in Aqueous Solution. *J. Am. Chem. Soc.* 1984, 106, 6049-6060.

13. Salomon, R. G.; Batyreva, E.; Kaur, K.; Sprecher, D. L.; Schreiber, M. J.; Crabb, J. W.; Penn, M. S.; DiCorletoe, A. M.; Hazen, S. L.; Podrez, E. A. Isolevuglandin-protein adducts in humans: products of free radical-induced lipid oxidation through the isoprostane pathway. *Biochim. Biophys. Acta* 2000, 1485, 225-235.

14. Sullivan, C. B.; Matafonova, E.; Roberts, L. J., II; Amarnath, V.; Davies, S. S. Isoketals form cytotoxic phosphatidylethanolamine adducts in cells. *J. Lipid Res.* 2010, 51, 999-1009.

15. Zagol-Ikapitte, I.; Masterson, T. S.; Amarnath, V.; Montine, T. J.; Andreasson, K. I.; Boutaud, O.; Oates, J. A. Prostaglandin H(2)-derived adducts of proteins correlate with Alzheimer's disease severity. *J. Neurochem.* 2005, 94, 1140-1145.

16. Zagol-Ikapitte, I., et al. Determination of the pharmacokinetics and oral bioavailability of salicylamine, a potent gamma-ketoaldehyde scavenger, by LC/MS/MS. *Pharmaceutics* 2010, 2, 18-29.

While the novel technology has been illustrated and described in detail in the foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A compound of Formula I:

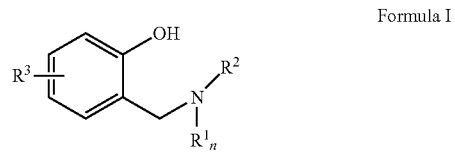

Formula I wherein:

$R^1$ is hydrogen;

$R^2$ is alkyl, substituted with $R^4$;

$R^3$ is selected from hydrogen, halogen, hydroxy, alkoxy, C1-C6 alkyl or C1-C6 alkyl substituted with alkyl, alkenyl, hydroxy, acyl, or alkoxy, or carbonyl;

$R^4$ is triphenylphosphonium with a counterion; and n is 1 or 2, wherein when n is 2, $R^1$ has a counterion.

2. The compound of claim 1, wherein $R^3$ is hydrogen.

3. The compound of claim 2, wherein $R^2$ is $C_5$ alkyl.

4. The compound of claim 1, wherein the counterion is bromide.

5. The compound of claim 1, wherein $R^3$ is alkoxy.

6. The compound of claim 1, wherein the counterion to $R^4$ is tetrafluoroborate.

7. A composition comprising: a compound of claim 1, and a pharmaceutically acceptable carrier.

8. A compound having the formula, (5-((2-hydroxybenzyl)amino)pentyl)triphenylphosphonium bromide:

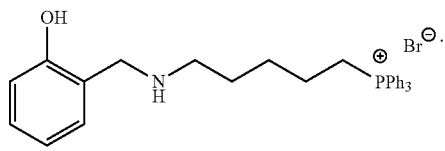

9. A compound having the formula, (5-((2-hydroxyphenyl)amino) pentyl)triphenylphosphonium bromide:

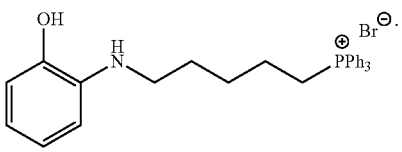

* * * * *